United States Patent Office 3,635,870
Patented Jan. 18, 1972

3,635,870
SEGMENTED POLYURETHANE ELASTOMERS
Wilhelm Thoma, Bergisch Neukirchen, Harald Oertel, Odenthal-Globusch, and Heinrich Rinke, Leverkusen, Germany, assignors to Farbenfabriken Bayer Aktiengesellschaft, Leverkusen, Germany
No Drawing. Filed Apr. 7, 1970, Ser. No. 26,424
Claims priority, application Germany, Apr. 11, 1969, P 19 18 504.7
Int. Cl. C07c 125/04; C08g 22/04
U.S. Cl. 260—30.8
17 Claims

ABSTRACT OF THE DISCLOSURE

The invention relates to linear segmented polyurethane elastomers consisting of the reaction product of an isocyanate preadduct containing 1.0 to 6.0% by weight of free NCO groups with chain lengtheners, said polyurethane elastomers containing at least 55 mol percent, based on the total amount of chain lengthening segments, of a chain lengthening segment of the structure

—NH—CO—NH—NH—CO—NH—
R—O—CO—NH—NH—CO—NH— wherein R is a divalent alkylene radical with 1 to 4 carbon atoms, an aromatic or an araliphatic radical.

---

The invention relates to highly elastic, linear segmented polyurethanes, advantageously in the form of highly elastic filaments, which have segments which result from the use of certain carbazine ester semicarbazides as chain lengtheners for NCO prepolymers, and to a process for the production of such polyurethanes.

It is known that substantially linear NCO preadducts of relatively high molecular weight (hereinafter referred to for brevity as NCO preadducts or NCO prepolymers), produced from polyhydroxy compounds of relatively high molecular weight (optionally with addition of smaller quantities of low molecular weight diols), and excess molar quantities of organic diisocyanates, in highly polar organic solvents, such as dimethylformamide, may be reacted with substantially bifunctional chain lengtheners which comprise 2 active hydrogen atoms, viscous solutions of substantially linear polyurethane elastomers being obtained, which are shaped when out of solution into elastic filaments or foils. Diamines particularly, preferably of aliphatic or araliphatic structure, and hydrazine or dihydrazide compounds are used as chain lengtheners. Diamines and hydrazine exhibit a very high reactivity with respect to the NCO preadducts, which advantageously have aromatically bonded NCO groups, and for this reason there is a great danger of the formation of inhomogeneous, crosslinked fractions ("jellies") in the elastomer solution. Chemical modifications or complicated technical devices are necessary in order to reduce this tendency to crosslink.

However, dihydrazide compounds when used as chain lengtheners (see German Patent 1,123,467) show such a reduced reactivity with respect to the NSO preadducts that the reaction can be conducted in a particularly satisfactory manner without an undesirable chemical crosslinking with "jellying" of the solution taking place. Such polyurethane elastomer solutions can be spun into highly elastic filaments, which show high tensile strength and low permanent elongations. It has been found, however, that such elastomer filaments stretch more in hot air than in air at room temperature when they are under a preliminary load and, after the load has been relaxed, they frequently have an undesirably large residual elongation. Also, after hydrothermal treatment (e.g. in boiling water), of more greatly pretensioned elastomer filaments (e.g. with 100% elongation), the residual elongations are possibly too great. This low resistance to stretching of such dihydrazide-lengthened elastomer filaments under thermal or hydrothermal conditions is particularly undesirable with finishing and dyeing operations.

If bis-semi-carbazides are used as chain lengtheners instead of the dihydrazides for the reaction with the NCO preadducts, e.g. 1,2-ethylene bis-semicarbazide or 1,4-tetramethylene bis-semicarbazide, the solubility of these bis-semicarbazides is very unsatisfactory. Depending on the structure of the bis-semicarbazides, they are not completely dissolved, even in boiling dimethylformamide. Furthermore, elastomer solutions are not obtained which are capable of being spun technically, since the solutions change into a gel-like state while they are being produced or after a short time. It is probable that the polyurethane elastomers which are to be shaped are insufficiently dissolved by the solvent and consequently they separate out in a paste-like form and, in this form, cannot be shaped into filaments or foils, or only with very great difficulty. Only by adding relatively large quantities of salts, such as LiCl, $CaCl_2$ or $CaBr_2$, can solutions be produced therefrom at high temperatures; however, such an addition of salt necessitates additional measures when spinning, e.g. washing of the filaments), and has a deleterious effect on the properties of the filaments.

Alkylene-bis-carbazine esters have already been proposed as chain lengtheners for polyurethanes. The polyurethanes of which the chains have been lengthened using alkylene-bis-carbazine esters show relatively low melting points, and filaments produced from such chain lengthened polyurethanes have an unsatisfactory thermal or hydrothermal behaviour, i.e. they are very greatly stretched under a load at relatively high temperatures, and also particularly when tested in hot water and after relaxation of the load, they show very high residual elongations. Likewise, in hot water, there is a great reduction in the tension when filaments or fabrics are held at certain elongations. In many cases, the filaments break in situ under test conditions in hot water. This behaviour of polyurethane filaments is disadvantageous when the fabrics made from them are treated under tension in hot water or steam during finishing and dyeing processes.

It is an object of this invention to provide polyurethane elastomers that avoid the above-mentioned disadvantages.

This object is accomplished by linear segmented polyurethane elastomers consisting of the reaction product of an isocyanate preadduct containing 1.0 to 6.0% by weight of free NCO groups with chain lengtheners, said polyurethane elastomer containing at least 55 mol percent, based on the total amount of chain lengthening segments, of a chain lengthening segment of the structure

—NH—CO—NH—NH—CO—NH—R—O
—CO—NH—NH—OC—NH— wherein R is a divalent alkylene radical with 2 to 4 carbon atoms or an aromatic or araliphatic radical of the formula:

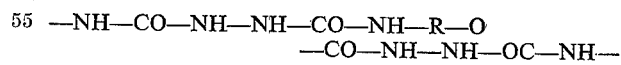

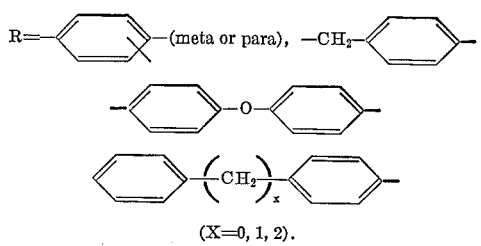

(X=0, 1, 2).

It is another object of this invention to provide a process for the production of substantially linear, segmented polyurethane elastomers which comprises reacting an isocyanate preadduct of a higher molecular weight dihydroxy compound and an excess molar quantity of diisocyanate, said preadduct containing 1.0 to 6.0% by weight of free NCO groups, with substantially equivalent quantities of bifunctional low molecular weight chain lengtheners containing two active hydrogen atoms, said chain lengtheners being at least 55 mol percent of carbazine ester semicarbazides of the formula

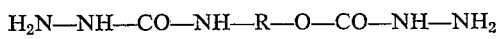
H₂N—NH—CO—NH—R—O—CO—NH—NH₂ wherein

R represents an alkylene radical with 2 to 4 alkylene groups or an aromatic or araliphatic radical, said reaction being carried out in the presence of highly polar organic solvents and with subsequent removal of the solvents.

In this way, linear segmented polyurethane elastomers are obtained, which consist of reaction products of highly molecular weight diisocyanates with chain lengtheners, containing chain-lengthening segments of the structure

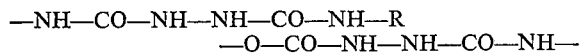
—NH—CO—NH—NH—CO—NH—R
—O—CO—NH—NH—CO—NH—

However, other bifunctional chain lengtheners can be used as well as the carbazine ester semicarbazides; it is adavntageous for at least 55 mol percent of the chain lengtheners necessary for the chain lengthening reaction with the NCO preadduct to be formed by the carbazine ester semicarbazides. The corresponding elastomers thus contain at least 55%, based on all the chain lengthening segments which are present, of such segments having the structure:

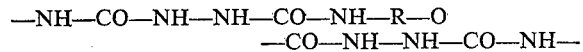
—NH—CO—NH—NH—CO—NH—R—O
—CO—NH—NH—CO—NH—

As the properties of the elastomers with bis-carbazine esters as chain lengtheners and the behaviour of corresponding bis-semicarbazides as chain lengtheners was known, it was extremely surprising that the carbazine ester semicarbazides of the formula:

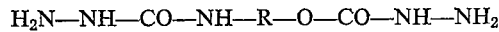
H₂N—NH—CO—NH—R—O—CO—NH—NH₂

(R being a divalent organic radical with the meaning indicated above), provide elastomers with very satisfactory properties, which are considerably better than those of the comparable elastomer lengthened with bis-carbazine ester. The solubility of the carbazine ester semicarbazides in the highly polar solvents is also sufficient for carrying out a normal chain lengthening reaction. Carbazine ester semicarbazides applicable to the invention are 4,4′-diphenylcarbazine ester semicarbazide, 4,4′-diphenylmethane carbazine ester semicarbazide, 4,4′-diphenyl ether carbazine ester semicarbazide, 4,4′-diphenylethane carbazine ester semicarbazide, 1,4-benzene carbazine ester semicarbazide, ω,ω′-p-xylylene carbazine ester semicarbazide, 1,4-butane carbazine ester semicarbazide, and 1,4-cyclohexane carbazine ester semicarbazide. Particularly outstanding properties are obtained with the polyurethane elastomers lengthened with 1,2-ethane carbazine ester semicarbazide, 1,3-propane carbazine ester semicarbazine and 1,4-carbazine ester benzyl semicarbazide, and for this reason they are used with advantage as bifunctional compounds comprising 2 active hydrogen atoms for the chain lengthening of the NCO preadducts, particularly when the polyurethanes are to be processed so as to form elastomer filaments. The chain lengtheners most preferred for elastomer filaments are those of the formula:

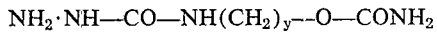
NH₂·NH—CO—NH(CH₂)ᵧ—O—CONH₂ in which y=2 or 3, and more particularly 1,2-ethane carbazine ester semicarbazide.

After the solution has been spun using conventional dry or wet spinning methods, such elastomers provide high-quality elastomer filaments with substantially improved thermal and hydrothermal properties while simultaneously having very satisfactory mechanical properties. in addition, the polyurethane elastomers have satisfactory solubility in common solvents, such as dimethylformamide, dimethylacetamide, dimethyl sulphoxide or N-methyl pyrrolidone, and they show an improved stability in respect of browning in light and they also show an improved resistance to oxidation. Furthermore, the new elastomer materials show substantially higher moduli with lower permanent elongations than the corresponding elastomers lengthened with dihydrazide or biscarbazine ester. Compared with diamines or hydrazine, which hitherto have been used industrially as chain lengtheners, the new carbazine ester semicarbazides, when used for lengthening the chains of NCO preadducts, also bestow on the elastomers which are formed substantially higher moduli and more favorable elastic and hydrothermal or thermal properties. The advantageous properties are more fully explained in the examples in which there are comparison tests.

The carbazine ester semicarbazides used according to the invention as chain lengtheners are new compounds, which can, for example, be produced by hydrazinolysis of the corresponding phenyl esters. The phenyl esters are obtainable by reacting aminoalcohols with chloroformic acid phenyl ester:

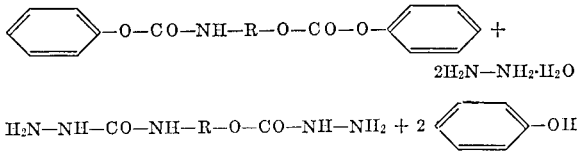

For the synthesis of elastomers, substantially linear NCO preadducts of relatively high molecular weight, produced from higher molecular weight polyhydroxy compounds (optionally with addition of smaller quantities of low molecular weight dihydroxy compounds) and excess diisocyanates, are reacted in highly polar organic solvents with substantially equivalent quantities of chain lengtheners (carbazine ester semicarbazides, optionally admixed with known chain lengtheners). The following processes may be mentioned as important examples of the production of elastomers with the

—NH—CO—NH—NH—CO—NH—R—O—
CO—NH—NH—CO—NH— segment, the segment having been formed by reaction of

H₂N—NH—CO—NH—R—O—CO—NH—NH₂ and the NCO groups of higher molecular weight diisocyanates O=C=N·Ro·N=C=O.

(a) The reaction of the NCO preadduct of higher molecular weight dihydroxy compounds and excess molar quantities of diisocyanates (NCO content in the preadduct approximately between 1% and 6% NCO, related to the solid content), with substantially equivalent quantities of bifunctional low molecular weight chain lengtheners having two active hydrogen atoms, in the presence of highly polar, organic solvents, carbazine ester semicarbazides of the formula:

H₂N—NH—CO—NH—R—O—CO—NH—NH₂ being used as chain lengthener (the radical R having the meaning indicated above).

(b) The reaction as in (a), but in addition to at least 55 mol percent of the carbazine ester semicarbazides as indicated using at the same time up to 45 mol percent of conventional bifunctional compounds having two active hydrogen atoms and with molecular weights of from 18 to 300 (e.g. water, hydrazine, aminoalcohols, diamines and dihydrazides) as chain lengtheners.

(c) The reaction of an isocyanate preadduct containing about 1 to 6% by weight of NCO, produced from higher molecular weight dihydroxy compounds, low molecular weight diols containing advantageously 1 or 2 tertiary amino groups in the molecule and with molecular weights of from 62 up to about 300, in quantities of about 0.05 to 1.0 mol per mol of higher molecular weight dihydroxy compound, and excess molar quantities of diisocyanates, with substantially equivalent quantities of carbazine ester semicarbazides of the formula:

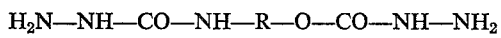

as chain lengthener in highly polar solvents.

(d) The reaction of an isocyanate preadduct, prepared as described in process (c), with approximately equivalent quantities of chain lengtheners, using at least 55 mol percent of the carbazine ester semicarbazides:

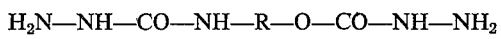

and up to 45 mol percent of conventional chain lengtheners.

The products obtained by the process are linear, segmented polyurethane elastomers, consisting of characteristic intralinear segments of the idealised structure I:

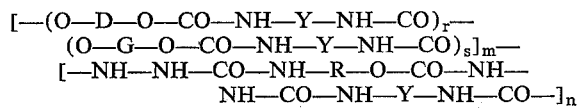

D being a long-chain, divalent, substantially aliphatic polymer residue of a higher molecular weight polyhydroxy compound with a melting point below 60° and a molecular weight of from 500 to 6000, without the terminal hydroxyl groups and without substituents which are reactive towards isocyanate;

Y is a divalent, organic radical of an aromatic, aliphatic, cycloaliphatic or araliphatic diisocyanate;

G is a divalent, aliphatic, cycloaliphatic or araliphatic radical of a dialcohol with a molecular weight between 62 and 300, advantageously containing one or more tertiary aliphatic amino groups, without the terminal hydroxyl groups;

R is a divalent organic radical, e.g. an alkylene radical with 1 to 4 alkylene groups, or an aromatic or araliphatic radical;

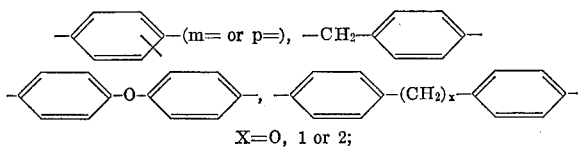

X=0, 1 or 2;

$r$=an integer of at least 1, e.g. from 1 to 5, advantageously from 1 to 3;

$s$=0 or an integer of at least 1, e.g. from 1 to 5, advantageously 1;

$m$=1 or an integer, e.g. from 1 to 5, advantageously from 1 to 3; and $n$=from 1 to 5, advantageously 1 or 2.

These elastomers show an elongation at break of more than 300% and must have an inherent viscosity (determined in 1% solution in hexamethyl phosphoramide at 25°) of at least 0.5, in order to produce satisfactory elastic properties in the filaments and foils.

In addition to structure segments of the Formula I, the substantially linear, segmented polyurethane elastomers can consist of up to a maximum of 45% by weight of intralinear segments, which are formed by reaction of the NCO preadducts with known chain lengtheners, such as water, aminoalcohols or compounds comprising 2 terminal $NH_2$ groups and have, for example, the structure II:

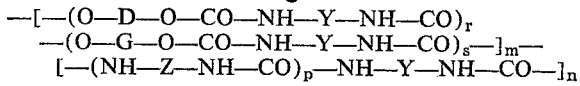

in which D, G, Y, $r$, $s$, $m$ and $n$ have the meanings indicated above, $p$=0 or 1 and Z is the radical of a known chain lengthener with two terminal $NH_2$ groups

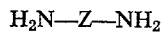

without these $NH_2$ groups. Z can be zero or a divalent organic radical, advantageously with from 2 to 13 carbon atoms, but without substituents which react with isocyanates.

Suitable higher molecular weight, substantially linear polyhydroxyl compounds with terminal hydroxyl groups (NO—D—OH) are, for example, polyesters, polyester amides, polyethers, polyacetals, polycarbonates or poly-N-alkyl urethanes, and it is possible for the above compounds optionally to comprise additional groups, such as ester, ether, amide, urethane or N-alkylurethane groups, with molecular weights between 600 and 5000, advantageously 800 to 3000, and melting points which are preferably lower than 60° C., and particularly lower than 45° C. Mixtures of the higher molecular weight polyhydroxyl compounds can also be used.

Compounds which may be particularly mentioned are polyesters of adipic acid and optionaly mixtures of dialcohols, e.g. ethylene glycol, propylene glycol, butane-1,4-diol, hexane-2,5-diol, 2,2,-dimethylpropane-1,3-diol, hexane-1,6-diol, 2-methylhexane-1,6-diol, 2,2-dimethylhexane-1,3-diol, p-bis-hydroxymethylcyclohexane, 3-methylpentane-1,4-diol and 2,2-diethylpropane-1,3-diol; preferred are polyesters with diols or mixtures of diols with 5 or more carbon atoms, since such polyesters show a relatively good resistance to hydrolysis and, particularly when used with diols having side chain alkyl radicals, they also exhibit a satisfactory low-temperature elasticity in the end products. Polyesters which are obtained by polyaddition of caprolactone to glycols with approximately the same molecular weight distribution are likewise suitable starting materials.

Polyurethane elastomers with outstanding resistance to hydrolysis can be obtained from polyalkylene ethers, such as polytrimethylene ether diols, and polypropylene glycols, but preferably from polytetramethylene ether diols, which optionally can also be used as mixed polyethers (small quantities of epoxides, such as propylene oxide or epichlorhydrin, being incorporated by condensation), or after modification of the terminal groups, e.g. replacement of the OH groups by the

group. Polyepichlorhydrins with terminal OH groups in the indicated molecular weight range are also suitable for flame-proof products. Basic polyethers, of which the tertiary amino groups can be (possibly partially) quaternised, are likewise suitable.

Suitable polycarbonates are those which contain hexane-1,6-diol as the only dialcohol or the predominant dialcohol as well as other diols, or those of $\omega$-hydroxycaproic acid-$\omega$-hydroxyhexyl esters.

Suitable diisocyanates (O=C=N—Y—N=C=O) are aliphatic, cycloaliphatic, araliphatic and aromatic diisocyanates and heterocyclic diisocyanates, possibly admixed with one another. Particularly worthy of mention are aromatic diisocyanates having a symmetrical structure, e.g. diphenylmethane - 4,4' - diisocyanate; diphenyldimethylmethane - 4,4' - diisocyanate; phenylene - 1,4 - diisocyanate; 2,2',6,6' - tetramethyldiphenylmethane - 4,4' - diisocyanate; diphenyl - 4,4' - diisocyanate; and diphenylether - 4,4' - diisocyanate or their alkyl-substituted, alkoxy-substituted or halogen-substituted derivatives, and also toluylene-2,4-diisocyanate and toluylene-2,6-diisocyanate and their industrial mixtures, 2,4-diisopropylphenylene-1, 3-diisocyanate, m-xylylene diisocyanate, p-xylylene diisocyanate, $\alpha,\alpha,\alpha',\alpha'$-tetramethyl-p-xylylene diisocyanate, as well as alkyl or halogen-substitution products of the above diisocyanates, e.g. 2,5-dichloro-p-xylylene diisocyanate or tetrachloro-p-phenylene diisocyanate, dimeric toluylene-2,4-diisocyanate or bis-(3-methyl-4-isocyanatophenyl)urea. Aliphatic diisocyanates such as hexane-1,6-diisocyanate, cyclohexane-1,4 - diisocyanate, dicyclohexylmethane-4,4'-diisocyanate, 1 - isocyanato-3-isocyanatomethyl-3,5,5-trimethylcyclohexane or 2,2,4-trimethylhexane-1,6-diisocyanate can possibly be used in part, and provide products which show very little discoloration on exposure to light. Furthermore, diisocyanates such as ω,ω'-di-(isocyanatoethyl)benzene or 1,2,3,4,5,6-hexahydrodiphenylmethane-4,4'-diisocyanate product products showing little discoloration on exposure to light.

Because of their being available industrially, it is advantageous to use diphenylmethane-4,4'-diisocyanate, diphenylether-4,4'-diisocyanate, p-phenylene diisocyanate, the isomeric toluylene diisocyanates and also (possibly in part) hexane-1,6-diisocyanate and the cis/cis- and/or cis/trans- and/or trans/trans-isomers of dicyclohexylmethane-4,4'-diisocyanate.

For the preparation of the substantially linear higher molecular weight isocyanate preadducts, the higher molecular weight polyhydroxyl compounds HO—D—OH which have been described are reacted with the diisocyanates in excess molar quantities, perhaps in the molar ratio from 1:1.25 to 1:4.0, preferably from 1:1.30 to 1:2.5, possibly with the diisocyanates added in steps, the reaction taking place in the melt or in solvents, such as tetrahydrofuran, dioxane, ethyl acetate, 2-butanone, chlorobenzene, or dimethylformamide, at temperatures up to about 130°, preferably from 70 to 100°. When using dimethylformamide as reaction medium, temperatures of from 20 to 70° are preferred. With smaller molecular weights of the higher molecular weight hydroxyl compounds, e.g. from 650 to 1250, the diisocyanates are preferably reacted in low molar ratios, about 1:1.25 to 1:2.0, and with higher molecular weights, e.g. from 1500 to 2500, preferably with higher molar ratios, e.g. from 1:1.5 to 1:2.5.

If a polyhydroxyl compound HO—D—OH is reacted with a diisocyanate OCN—Y—NCO in the molar ratio 1:2, an NCO preadduct of the idealised structure:

OCN—Y—NH—CO—O—D—
O—CO—NH—Y—NCO is formed. If the reaction takes place in the molar ratio 1:1.5 (=2:3), an NCO preadduct of the idealised general structure:

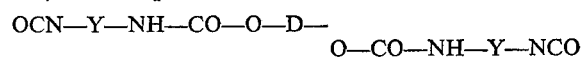

is formed.

From a practical point of view, the same structure is formed if first the polyhydroxyl compounds are reacted in the OH/NCO ratio of 2:1 and the new "pre-lengthened" di-hydroxy compound is thereafter transformed—optionally with another diisocyanate—in the OH/NCO ratio of 1:2 into the isocyanate preadduct. With other molar ratios, suitable random mixtures of corresponding NCO preadducts can occur.

In the production of the isocyanate preadducts, relatively small quantities of low molecular weight diols HO—G—OH with molecular weights from 62 up to about 300, especially those which comprise one or more tertiary amino groups, can also be used in addition to the higher molecular weight polyhydroxyl compounds HO—D—OH in the reaction with the diisocyanates. The diols can be added in admixture with the higher molecular weight polyhydroxyl compounds or at any time during or even after the formation of the NCO preadduct from diisocyanate and higher molecular weight polyhydroxyl compounds. Used as such diols are, for example, ethylene glycol, butane-1,4-diol, bis-N,N-(β-hydroxyethyl)-methyl amine, bis-N,N-(β-hydroxypropyl)-methylamine, N,N'-dimethyl-N,N'-bis(β-hydroxyethyl)-ethylene diamine, N,N'-dimethyl - N,N' - bis-(β-hydroxypropyl)-ethylene diamine, N,N' - bis - (β-hydroxypropyl)-piperazine, N,N'-bis(β-hydroxyethyl)-piperazine or hydroquinone-bis-(β-hydroxyethyl ether). The use of diols with tertiary amino groups improves particularly the capacity for dyeing, and also improves the resistance to degradation by light and also provides the starting point for further aftertreatments, e.g. cross-linking reactions with 4,4'-bis-chloromethyl diphenyl ether.

Generally, between 0.05 and 1.0 mol, preferably from 0.05 to 0.5 mol and especially from 0.07 to 0.25 mol, of low molecular weight diols is used per mol of polyhydroxyl compound used in the formation of the NCO preadduct. It is preferred in these cases to increase the quantity of dissocyanates already introduced to above the molar ratios just indicated, by the quantity corresponding to the low molecular weight diols, e.g. from 0.05 to 1.0 mol. In this case, isocyanate preadducts are formed which are of the structure:

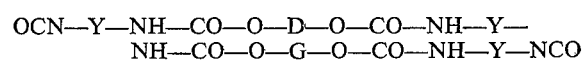

or, in the case of the "pre-lengthening," an NCO preadduct of the structure:

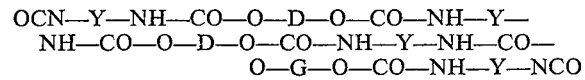

The typical structure segments of the isocyanate preadducts, which can also be called "higher molecular weight diisocyanates," which result from "pre-lengthening" or incorporation of glycol, are formed in a more or less statistical sequence, and can possibly occur with repeated recurrence. The content of NCO groups in the isocyanate preadducts, (calculated as a percentage by weight of NCO in the solvent-free NCO preadduct), is of essential importance in relation to the properties of the polyurethane elastomers obtained therefrom. The only substantially suitable NCO preadducts for the reaction with the carbazine ester semicarbazides to be used according to the invention as chain lengtheners, are those of which the NCO content in the solid substance is at least 1.0%, and advantageously the isocyanate preadducts are to have from 1.5 to about 6% by weight of NCO. Especially preferred are from 1.75 to 3.5% of NCO, calculated on the solid content of the isocyanate preadduct, when the elastomers produced therefrom are to be used for the production of elastomer filaments.

As the bifunctional chain lengtheners comprising two active hydrogen atoms, carbazine ester semicarbazides of the formula:

are used in approximately equivalent quantities, related to the NCO groups of the NCO preadduct, and advantageously as the only chain lengthener. The 1,2-ethane carbazine ester semicarbazide and the 1,3-propane carbazine ester semicarbazide are particularly preferred.

However, as well as at least 55 mol percent of the carbazine ester semicarbazides, it is also possible at the same time to use up to 45 mol percent of other conventional chain lengtheners with molecular weights from 18 to about 300, such as water, glycols or those of the formula:

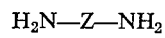

Z having the meaning indicated above.

Suitable for use as conventional chain lengtheners are, for example, water, aminoalcohols, such as aminoethanol, or organic compounds with two terminal NH₂ groups, for example hydrazine (or hydrazine hydrate), aliphatic diamines, preferably ethylene diamine, 1,2-propylene diamine, cis- and/or trans-1,3-diaminocyclohexane, N,N-bis-(γ-aminopropyl)-methylamine, N,N'-dimethyl-N,N'-bis-(γ-aminopropyl)-ethylene diamine, N,N'-bis-(γ-aminopropyl-piperazine, or N,N', - bis - (γ - aminopropyl)-2,5-dimethylpiperazine, aromatic diamines, preferably 4,4'- diaminodiphenylmethane, 4,4'-diaminodiphenyl ether, 4,4'-diaminodiphenylethane, or 4,4'-diaminodiphenyldimethylmethane, or araliphatic diamines, such as m- or p-xylylene diamine, 1,4-bis-($\beta$-aminoethyl)benzene or $\alpha,\alpha,\alpha',\alpha'$-tetramethyl-p-xylylene diamine, or dihydrazides, bis-semicarbazides or bis-carbazine esters, such as carbodihydrazide, terephthalic acid dihydrazide, hydroquinonediacetic acid dihydrazide, aminoacetic acid hydrazide, methylamino-N,N-bis-(propionic acid hydrazide), piperazine -N,N'-bis-(propionic acid hydrazide) or N,N'-dimethylethylenediamine-N,N'-bis-(propionic acid hydrazide).

The reactions can also be carried out with stepwise chain lengthening or with mixtures of the chain lengtheners.

For lowering the molecular weight, and in order to still obtain soluble polyurethane elastomers, despite a certain branching of the molecule which has possibly occurred, monofunctional compounds can also be used in minor quantities, e.g. from 0.01 to 10 mol percent (based on the NCO content) for chain termination reactions, e.g. butylamine, dibutylamine, acethydrazine, butyl semicarbazide, N,N-dimethylhydrazine or 1-butanol.

The reaction of the isocyanate preadducts with the chain lengtheners takes place with approximately equivalent quantities (based on the NCO content), e.g. from 100 to 120% and preferably from 100 to 110 mol percent, of chain lengtheners, preferably at temperatures of from about 0 to 130° C. and advantageously of from 20 to 80° C., in solvents. The higher the excess of chain lengtheners is chosen to be, the lower is the molecular weight of the polyurethane, because of the termination of the chain. By careful addition of other and preferably less reactive aliphatic diisocyanates of triisocyanates, it is possible to adjust to the required molecular weight and to the required solution viscosity (according to German Pat. 1,157,386). After achieving the required viscosity, the still unreacted terminal groups can be stabilised by reaction with monoisocyanates, such as butyl isocyanate or carboxylic acid anhydrides, e.g. acetanhydride, or phthalic anhydride, or other substances with an acylating action, e.g. acid chlorides or carbamic acid chlorides.

Suitable solvents are highly polar, organic water-soluble solvents which comprise amide, urea or sulphoxide groups and which are capable of developing strong hydrogen bonds, and advantageously having boiling points from about 140 to 225° C., for example, dimethylformamide, diethylformamide, formamide, dimethylacetamide, formylmorpholine, hexamethylphosphoramide, tetramethyl urea, dimethylsulphoxide and dimethylcyanamide or their mixtures. Solvents which are preferred from a practical point of view are dimethylformamide or dimethylacetamide. Up to a certain percentage, which is about 33% by weight of the solvent quantity, it is possible to add to the highly polar solvents less polar solvents which, by themselves, are incapable of dissolving the polyurethanes or polyurethane ureas, e.g. tetrahydrofuran, dioxane, acetone, glycol monomethyl ether acetate or chlorobenzene. The concentration of the elastomer solutions amounts to from about 5 to 43% by weight, preferably from 10 to 33% by weight and even more preferably from 15 to 28% by weight, while the viscosities should be between approximately 1 and 1000 poises, preferably between about 50 and 800 poises/20° C. The molecular weight of the segmented elastomers according to the invention is to be so high that the inherent viscosity $$\eta_i = \frac{l_n \eta_R}{C}$$

measured at 25° C., is at least 0.5 and preferably from 0.70 to 1.9, when 1.0 g. of elastomer in 100 ml. of hexamethylphosphoramide solution (phosphoric acid trisdimethylamide) is held in solution at 20° C. In the formula, $\eta_R$ represents the relative viscosity, (ratio between the throughflow time of the solution and the throughflow time of the solvent), and C represents the concentration in g./100 ml. When the melting points of the elastomers are determined on the Kofler block, these are to have values above 200° C. and preferably above 230° C., when a starting material for elastomer filaments is concerned.

The solutions of the polyurethanes or polyurethane ureas can have added to them organic or inorganic pigments, dyestuffs, optical brighteners, UV-absorbers, phenolic antioxidants, special light-protecting agents, such as N,N-dialkyl semicarbazides or N,N-dialkyl hydrazides, and substances with a crosslinking action, such as paraformaldehyde, melamine hexamethylol ether or other formaldehyde derivatives, such as diemthylol dihydroxyethylene urea, dimethylol ethylene urea, trimethylol melamine, dimethylol urea dimethyl ether, and quaternising agents, e.g. dichloromethyl durol, or polyaziridine ureas, e.g. hexamethylene-$\omega,\omega$-bis-ethylene imide urea. By a crosslinking reaction, which is, for example, thermally initiated, the resistance to dissolving and swelling with respect to highly polar solvents is altered.

The elastomer solutions can be freed from the solvent in accordance with the many different processes known per se, by evaporation or coagulation, in some cases with simultaneous formation of the required shaped elements, such as filaments or foils. Films or coatings are produced by drying of the elastomer solution on supports, e.g. glass plates or textile substrates. Filaments can be obtained by wet or dry spinning processes. Microporous coatings are produced by brushing elastomer solutions on to, for example, textile supports (e.g. fleeces), in the presence of humid air, if desired, and subsequent coagulation in non-solvents for the polyurethane, e.g. water or aqueous solutions. By the use of suitable additives, such as finely divided salts, emulsifiers or soluble polyamides, the microporosity of the films can be further improved.

In the following examples, temperatures are indicated in degrees centigrade.

The films or filaments referred to in the examples were produced and measured by the following standard procedures:

Films: By brushing the elastomer solution on to glass plates and drying (30 minutes at 70° C. and 45 minutes at 100° C.), final thickness about 0.15 to 0.25 mm. By means of a foil-cutting machine, in some cases filaments with a thickness of about 250 to 800 dtex were cut and measured.

Wet-spinning process: An advantageously 20% elastomer solution is spun with a delivery quantity of about 1 ml./minute through a spinneret with 20 holes of 0.12 mm. diameter into a coagulation bath at 80 to 85° C. consisting of 90% by weight of water and 10% by weight of dimethylformamide (length about 3 metres), withdrawn at a speed of 5 m./minute and wound after having passed through a washing section (water at 90° C.). The spools were kept for one hour in hot water (50° C.) and then dried.

Dry-spinning process: A preferably 24 to 26% elastomer solution is spun through a spinneret with 16 holes of 0.20 mm. diameter into a shaft with a length of 5 metres and heated to 220 to 250° C., into which is injected air at about 210 to 280° C. The filaments are withdrawn at a speed of about 100 m./min. and, after preparation with a talcum suspension, are wound with stretching, for example, at a speed of 125 to 175 m./minute. The filaments can thereafter be further treated by heat on spools or in continuous form. (The spinning speeds can also be chosen to be higher, e.g. 300 to 400 m./min.)

The elongation at break is measured in a tearing machine with control of the tensioned length by a light barrier and with compensation of the actual clamp slip.

In order to characterise the elastic values, the 300% modulus is determined in the first expansion curve, the 150% modulus is determined in the third reverse curve and the permanent elongation is determined after threefold 300% elongation, 30 seconds after relaxation.

Determination of the heat distortion temperature (HDT) on elastomer filaments:

The count is established on elastomer filaments, which have been laid out under normal atmospheric conditions without any tension for about 3 hours (weighing of a piece of filament which is under a preliminary load of 0.045 mg./dtex). An elastomer filament is hung with a clamping length of 250 mm. under a preliminary load of 1.8 mg./dtex. at room temperature in a tube which contains air or is filled with nitrogen. The tube is surrounded by a heating jacket, through which flows heated silicone oil controlled by a thermostat. The temperature in the tube is first of all raised during 30 minutes up to about 125°. The further rise in temperature is carried out at a rate of 3° C. every 5 minutes, until a change in length of the elastomer filament to more than 400 mm. has occurred. The measurement values obtained are plotted in a diagram in such a way that one unit of length on the abscissa corresponds to a temperature difference of 10° C. and one unit of length on the ordinate corresponds to a change in length of the elastomer filament of 20 mm. The heat-distortion temperature (HDT) is that temperature which is read off by vertical projection of the point of contact of the 45° tangent to the temperature/length-change curve on the abscissa.

The thermal resistance of the elastomer is to be evaluated as being higher correspondingly as the HDT value is found to be higher. The value should be at least 140° C., and for high-quality elastomer filaments at least 145°, and preferably higher than 150°.

Determination of the hot water tension drop (HWTD) of elastomer filaments:

A piece of filament with 100 mm. clamping length (pretensioning weight 0.9 mg./dtex) is stretched at 20° C. by 100% and the thread tension (mg./dtex) resulting after 2 minutes is measured (1st value). The filament, held stretched at 100%, is then immersed in water at 95° C. and the tension being produced after a residence time of 3 minutes is determined (2nd value). After this measurement, the filament is again removed from the water bath and left for 2 minutes at room temperature. The filament still prestretched in the clamp is thereafter relaxed until free from tension and the residual elongation which remains is immediately determined (3rd value).

Diagram of the reproduction in the examples (abbreviation HWTD):

1st value:
  Tension values—in air at 20° (mg./dtex)
2nd value:
  Tension values—in water at 95° (mg./dtex)
3rd value—residual elongation after relaxation (in air) at 20° (percent)

The hydrothermal properties are to be evaluated as being higher correspondingly as the amount of the 2nd value (tension in hot water in mg./dtex) is larger and the 3rd value (the residual elongation after the treatment in the relaxed state) is smaller. The tension value in water should show at least a value of 13.5 mg./dtex and, with high-quality elastomer filaments, a value of at least 18 mg./dtex is required. The residual elongation after hydrothermal loading should be smaller than 45% and more preferably smaller than 40% in the relaxed state.

Determination of the hot water stretching (HWS) of elastomer filaments:

A weight of 27 mg./dtex is hung by means of a clip device on a piece of filament with a length of 50 mm. and the filament is left hanging for 25 minutes at room temperature in air. After a loading time of 25 minutes, the percentage of stretching as found is determined (1st value). Thereafter, the filament thus stretched is immersed with its pretensioning weight immediately in water at 95° C. and the stretching which occurs in water is read off after 25 minutes. The reading is a stretching as a percentage, related to the clamped length of 50 mm. (2nd value). The loaded filament is thereafter removed from the hot water bath and then, by lifting the weight until there is no longer any tension, the remaining residual elongation is determined (3rd value).

Diagram of the reproduction in the examples (abbreviation HWS):

1st value:
  Stretching—in air at 20° (percent)
2nd value:
  Stretching—in water at 95° (percent)
3rd value—Residual elongation (after relaxation) in air at 20° (percent)

The hydrothermal properties are to be evaluated as being higher correspondingly as the 2nd value (stretching in hot water) is smaller and the 3rd value (permanent elongation after relaxation) is smaller.

For high-quality elastomer filaments, the 2nd value should be smaller than 250% and preferably smaller than 150%; the residual elongation (3rd value) should be smaller than 150% and preferably smaller than 100%.

The melting point of the elastomer substance is established on a film strip after standing for 2 minutes on the Kofler block and should be higher than 200° and preferably higher than 230° for elastomer filaments.

PRODUCTION OF THE CARBAZINE ESTER SEMICARBAZIDES (I) Ethylene carbazine ester semicarbazide $$H_2N—NH—CO—O—(CH_2)_2—NH—CO—NH—NH_2$$

91.5 g. of ethanolamine (1.50 mol) are dissolved in 300 ml. of pyridine. 450 g. of phenyl-chloroformic acid ester are added dropwise at 5 to 10° during 30 minutes. The reaction mixture is then heated for 30 minutes at 45 to 50°. The reaction mixture, cooled to 10 to 15°, is poured on to about 1½ litres of iced water, the pH value is adjusted by means of semi-concentrated hydrochloric acid to 2 and the phenylethylcarbonate carbamic acid phenyl ester is taken up in 500 ml. of methylene chloride. After distilling off the solvent, 383 g.=88.5% of the theory, of the carbonate urethane are obtained.

205 g. of hydrazine hydrate are placed in 300 ml. of i-propanol at 20°. A solution of 290 g. of phenylethylcarbonate carbamic acid phenyl ester (0.965 mol) in 600 ml. of i-propanol is allowed to run into the hydrazine solution during 5 minutes. The temperature then rises to 50°. The reaction solution is well cooled with ice and common salt, and then 129 g. of ethylene carbazine ester semicarbazide crystallise out in a yield of 76%. The crude product is dissolved and allowed to crystallise from 1.5 ml./g. of water and 10 ml./g. of i-propanol, the i-propanol being added to the aqueous solution; M.P. 125 to 126°.

$C_4H_{11}N_5O_3$ (177.2).—Calculated (percent): N, 39.53; O, 27.09. Found (percent): N, 39.45; O, 27.5.

(II) 1,3-propylene carbazine ester semicarbazide $$H_2N—NH—CO—O—(CH_2)_3—NH—CO—NH—NH_2$$

37.5 g. of 1,3-propanolamine (0.50 mol) are dissolved in 150 ml. of pyridine. 157 g. of phenyl chloroformic acid ester are introduced dropwise at 0 to 5° into the propanolamine solution. After adding the chloroformic acid ester, the reaction mixture is heated for 30 minutes at 50° and then worked up as under (I). 136 g.=86.5% of the theory are obtained of the phenylpropylcarbonate carbamic acid phenyl ester as an oil.

85 g. of hydrazine hydrate are initially introduced into 100 ml. of methanol at 20° and the solution of 133 g. of phenylpropylcarbonate carbamic acid phenyl ester (0.422 mol in 250 ml. of methanol is allowed to run in. In an exothermic reaction (rise in temperature to 45°), the 1,3-propylene carbazine ester semicarbazide is formed. The reaction solution, from which the reaction mixture does not crystallize out, even at low temperature, is concentrated by evaporation under vacuum (water bath), the residue is stirred with 350 ml. of isopropanol and kept for 12 hours at 0°. The 1,3-propylene carbazine ester semicarbazide is obtained in a yield of 60%. The crude product is dissolved and allowed to crystallise from 1.0 ml./g. of water and 10 ml./g. of isopropanol; M.P. 106 to 108°.

(III) 1,4-benzylcarbazinic acid ester semicarbazide

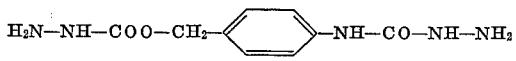

227 g. of 4-aminobenzyl alcohol are dissolved in 700 ml. of chloroform and 330 ml. of pyridine. 605 g. of phenyl chloroformic acid ester are added dropwise to the solution at 5 to 10° C. After completing the addition of the acid chloride, the reaction mixture is heated for 30 minutes at 50 to 55° C. After cooling, the reaction solution is washed twice with water so as to remove the pyridine-HCl salt. After distilling off the chloroform, the phenylbenzyl carbonate carbamic acid phenyl ester is left behind as an oil and this crystallises on standing for a relatively long time. M.P. 129 to 130° C.; yield practically quantitative.

Into a solution of 85 g. of hydrazine hydrate in 85 ml. of i-propanol is allowed to flow at room temperature a solution of 200 g. of phenylbenzyl carbonate carbamic acid phenyl ester in 350 ml. of i-propanol. In an exothermic reaction (rise in temperature to 54 to 55°), the 1,4-benzyl carbazine ester semicarbazide is formed. After cooling, the crystallisate is filtered off with suction, washed with i-propanol and recrystallised from 4 ml./g. of water+8 ml./g. of i-propanol. Yield: 72%; M.P. 127 to 128° C.

$C_9H_{13}N_5O_3$ (239.2).—Calculated (percent): N, 29.28. Found (percent): N, 29.3.

PRODUCTION OF THE CHAIN LENGTHENER FOR THE COMPARISON TESTS

Ethylene-bis-carbazine ester 31.0 g. of ethylene glycol are initially introduced into 150 ml. of pyridine. At 10 to 15°, 157 g. of phenylchloroformic acid ester are added dropwise; the reaction mixture is thereafter heated for 60 minutes at 50°. After cooling, the reaction mixture is introduced into 1 litre of water and the ethylene-bis-phenyl carbonate precipitates out; it is thoroughly washed with water, dried and recrystallised from 3 ml./g. of alcohol. Yield: 75%, M.P.: 97°.

$C_{16}H_{14}O_6$ (302.3).—Calculated (percent): O, 31.76. Found (percent): O, 31.6.

$H_2N-NH-CO-O-(CH_2)_2-O-CO-NH-NH_2$

A hot solution of 55.0 g. of ethylene-bis-phenyl carbonate (0.182 mol) in 250 ml. of alcohol is allowed to run at room temperature into a solution of 40 g. of hydrazine hydrate in 40 ml. of alcohol. The reaction mixture is heated for 15 minutes to boiling point. On cooling, the ethylene-bis-carbazine ester crystallises out with a yield of 90%; it is recrystallised from 2 ml./g. of water and 6 ml./g. of methanol; M.P. 125 to 128°.

$C_4H_{10}N_4O_4$ (178.2).—Calculated (percent): N, 31.45. Found (percent): N, 31.70.

Ethylene-bis-semicarbazide $H_2N-NH-CO-NH-(CH_2)_2-NH-CO-NH-NH_2$ 112 g. of hydrazine hydrate are initially introduced into 120 ml. of methanol and then 166 g. of ethylene-bis-carbamic acid phenyl ester are introduced in the solid form. The reaction mixture is heated for 45 minutes to boiling point. After cooling, the crystallisate is filtered off with suction, washed with methanol, dried and dissolved and allowed to crystallise from 1.2 ml./g. of water and 7 ml./g. of methanol; yield 80%, M.P. 164 to 165°.

$C_4H_{12}N_6O_2$ (176.2) — Calculated (percent): C, 27.27; H, 6.87; N, 47.70; O, 18.16. Found (percent): C, 27.65; H, 6.93; N, 47.64; O, 18.25.

1,3-propylene-bis-carbazine ester $H_2N-NH-CO-O-(CH_2)_3-O-CO-NH-NH_2$ 38 g. of propane-1,3-diol are reacted in 175 ml. of pyridine in analogous manner to the ethylene-bis-carbazine ester with 1.57 g. of phenyl chloroformic acid ester. The reaction mixture is poured onto iced water and acidified with 10% hydrochloric acid so an to take up the excess pyridine. The oily bis-carbonate is taken up in methylene chloride. The 1,3-propane-bis-phenyl carbonate is isolated therefrom with a yield of 80% as an oil.

The solution of 120 g. of 1,3-propane-bis-phenyl carbonate in 75 ml. of alcohol is allowed to run into a solution of 75 g. of hydrazine hydrate in 75 ml. of alcohol. In an exothermic reaction (rise in temperature to 64°), the 1,3-propylene-bis-carbazine ester is formed, and the latter, after intensive cooling, crystallises out with a yield of approximately 50%. M.P. 83 to 85°.

The following examples are to further illustrate the invention without limiting it.

PRODUCTION OF THE POLYURETHANE ELASTOMERS

Example 1.—3000 g. of a mixed polyester of adipic acid and the glycol mixture of hexane-1,6-diol and 2,2-dimethylpropane-1,3-diol (molar ratio of the glycols 65:35), molecular weight 1690, are heated with 60.0 g. of N,N-bis-(β-hydroxy-propyl)-methylamine and 813 g. of diphenylmethane-4,4'-diisocyanate for 60 minutes at 100° C. The melt is taken up in 3000 g. of dioxane and cooled to room temperature. The NCO content of the NCO preadduct solution is 1.27% (corresponds to 2.24% of NCO in the solid substance).

5.55 g. of ethylene carbazine ester semicarbazide

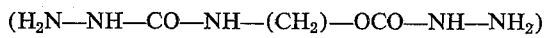

are dissolved in 300 g. of dimethylformamide at 70°. 200 g. of the NCO preadduct solution are allowed to run into the solution of the chain lengthener at 30°, a homogeneous, clear, viscous elastomer solution being formed; solid content 23.3%. The filaments obtained by the wet-spinning process (see general method of procedure) show high mechanical strength, favourable elastic properties and particularly good hydrothermal properties (see Table 1) and substantially more desirable values are obtained than when using ethylene-bis-carbazine ester as the chain lengthener.

Example 2.—200 g. of the mixed polyester described in Example 1 are heated with 4.0 g. of N,N-bis-(β-hydroxypropyl)-methylamine and 54.2 g. of diphenylmethane-4,4'-diisocyanate for 60 minutes at 100°. The melt is taken up in 200 g. of chlorobenzene and cooled to room temperature. The NCO content of the NCO preadduct solution is 1.26% (corresponding to 2.22% of NCO in the solid substance).

6.0 g. of 1,3-propylene carbazine ester semicarbazide ($H_2N-NH-CO-O-(CH_2)_3-NH-CO-NH-NH_2$) are dissolved in 25 g. of water. The aqueous solution is diluted with 300 g. of dimethylformamide. The NCO preadduct solution is allowed to run in at 20°, a homogeneous, clear, viscous elastomer solution with a solid content of 22.6% being formed; M.P. 212 to 215° (Kofler block). The filaments obtained by the wet-spinning process show good mechanical strength, desirable elastic properties and good hydrothermal properties (see Table 1), which are substantially better than those obtained when using 1,3-propylene-bis-carbazine ester as the chain lengthener.

Example 3.—To 400 parts of a linear polytetramethylene ether diol of molecular weight 1020 is added 0.8 part by volume of a 35% $SO_2$ solution in dioxane, followed by a solution of 84.7 parts of phenylene-1,4-diisocyanate in 120 parts of dimethylformamide, while cooling with ice. The temperature rises quickly to about 50° C. After the exothermic reaction has finished, the temperature is kept at 50° C. with a water bath until, after a reaction time of 50 minutes and cooling to room temperature, the NCO content of the solution is 1.75% (corresponding to 2.19% of NCO in the solvent-free NCO preadduct).

3.98 parts of 1,2-ethane carbazine ester semicarbazide ($H_2N$—NH—CO—NH-($CH_2$)—OCO—NH—$NH_2$) are dissolved at 80° C. in dimethylformamide and, within 2 minutes, 103 parts of the above NCO preadduct solution are added while stirring vigorously, a highly viscous, homogeneous, clear elastomer solution being formed (860 poises/20° C./c.=25.5%). After diluting the solution with dimethylformamide to 20%, the solution (192 poises) is cast as films or spun by the wet-spinning process into filaments.

Filaments having very good mechanical and elastic values (e.g. high moduli and high elongation at break) and extremely favourable values for HDT and hot water stretching and hot water tension drop are obtained (see Table 1). The filaments show a very good resistance to discoloration and degradation in light or under ultraviolet irradiation.

Example 4.—3.78 parts of 1,2-ethane carbazine ester semicarbazide and 0.058 part of hydrazine hydrate (molar ratio of the chain lengtheners 95:5) are dissolved at 80° C. in dimethylformamide and 105 parts of the NCO preadduct solution of Example 3 are added, a colourless, homogeneous, highly viscous elastomer solution (1020 poises/20° C./c.=25.9%) being formed. After dilution to 20% (205 poises), films are cast and filaments are spun by the wet-spinning process, which have excellent elastic, thermal and hydrothermal properties (see Table 1).

Example 5.—3.58 parts of 1,2-ethane carbazine ester semicarbazide are dissolved in 7 parts of water at 35° C., 0.137 part of ethylene diamine is added and the solution made up with 225 parts of dimethylformamide. The mixtures of chain lengtheners (containing 90 mol percent of carbazine ester semicarbazide and 10 mol percent of ethylene diamine) is mixed with 105 parts of the NCO preadduct solution of Example 3, a viscous, homogeneous, clear, light-coloured elastomer solution of 145 poises being formed. By adding 0.096 part of hexane-1,6-diisocyanate, the viscosity increases to 260 poises. After casting as films and spinning into filaments, the properties are determined. The elastomer filaments have the very high heat distortion temperature (HDT) of 182° C. (see Table 1).

Example 6.—2.19 parts of 1,2-ethane carbazine ester semicarbazide and 1.09 parts of 1,4-phenylene diamine (molar ratio 55:45) are dissolved in 229 parts of dimethylformamide at 60° C., and 103 g. of the NCO preadduct solution of Example 3 are added. After standing for several hours, the viscosity rises to 218 poises/20°. By adding 0.16 part of hexane-1,6-diisocyanate, a rise in viscosity to 920 poises/20° C. is produced. After dilution to a concentration of 20%, the solution (154 poises/20° C.) is cast as films or subjected to wet-spinning.

Despite the mixed lengthening with two chain lengtheners, filaments with very good hydrothermal properties and high heat distortion temperature are obtained (see Table 1).

Example 7.—5.90 g. of 1,4-benzyl carbazine ester carbazide are dissolved in 250 g. of DMF. At 20° C. and while stirring well, 150 g. of the NCO prepolymer solution according to Example 1 are allowed to run in and a clear, viscous elastomer solution is formed which has a solid content of 22.5% and a viscosity of 209 poises/20° C. The filaments obtained by the wet-spinning process show good mechanical and elastic properties (see Table 1). Melting point of the elastomers 228 to 234° C.

TABLE I

| Example No. (nature of chain lengthening) | Filament forming method | Elastic properties | | | | | | Thermal and hydrothermal properties | | | | | | |
|---|---|---|---|---|---|---|---|---|---|---|---|---|---|---|
| | | Count, dtex. | Tensile strength, g./dtex. | Elongation at break, percent | Modulus 300%, mg./dtex. | Modulus 150%, 3-return curve, mg./dtex. | Permanent elongation after 3×300% elongation, percent | HDT, °C. | HWTD tension | | | Residual elongation after hydrothermal loading | HWS stretching | | After relaxation at 20° air at 20° percent |
| | | | | | | | | | In air at 20°, mg./dtex. | In water at 95°, mg./dtex. | | | In air at 20°, percent | In water at 95°, percent | |
| Example 1, ethylene carbazine ester semicarbazide | N F | 346 440 | 0.68 0.69 | 465 555 | 175 118 | 23 21 | 15 13 | 161 | 48.1 | 22.6 | 36 | 48 | 174 | 74 |
| Example 2, 1,3-propylene carbazine ester semicarbazide | N F | 386 307 | 0.60 0.54 | 510 525 | 134 104 | 20 19 | 16 16 | 151 | 37.1 | 15.8 | 41 | 66 | Breaks off | |
| Example 3, 1,2-ethane carbazine ester semicarbazide | N F | 336 333 | 0.70 0.50 | 525 662 | 177 128 | 19 18 | 22 22 | 190 | 55 | 26.7 | 35 | 34 | 74 | 24 |
| Example 4, 1,2-ethane carbazine ester semicarbazide/hydrazine (95:5) | N F | 355 328 | 0.74 0.40 | 503 645 | 165 131 | 20 17 | 22 17 | 190 | 53.1 | 26.1 | 37 | 40 | 88 | 34 |
| Example 5, 1,2-ethane carbazine ester ethyl semicarbazide/ethylene diamine (90:10) | F | 323 400 | 0.68 | 504 720 | 154 122 | 17 16 | 17 14 | 182 | | | | | | |
| Example 6, 1,2-ethane carbazine ester ethyl semicarbazide/1,4-phenylene diamine | N F | 316 400 | 0.57 0.72 | 473 605 | 167 115 | 18 16 | 21 19 | 182 | 44.8 | 23.2 | 20 | 62 | 132 | 48 |
| Example 7, 1,4-benzyl carbazine ester semicarbazide | N F | 315 394 | 0.55 0.64 | 450 595 | 160 114 | 20 19 | 22 17 | 145 | 40.0 | 14.1 | 53 | 60 | 388 | 193 |

In Tables 1 and 2:

F represents measurement results on cut filaments from films which are obtained by spreading the solution on glass plates and evaporating the solvent at 100°.

N represents standard wet-spinning process: spinning of 20% by weight elastomer solutions into a bath of 90% water and 10% dimethylformamide.

The elastomer filaments indicated in Examples 1 to 7 show no discoloration on treatment with dilute solutions of heavy metal salts (e.g. copper sulphate) or after washing or hydrolysis tests in soap/soda solution at 90°.

The value of the inherent viscosity of the elastomers in Examples 1 to 6 is within the commercial range of 0.7 to 1.9.

COMPARISON TESTS (A) Chain lengthening with ethylene-bis-carbazine ester

5.65 g. of ethylene-bis-carbazine ester are dissolved in 300 g. of dimethylformamide. At 30°, 200 g. of NCO preadduct solution are allowed to run in, a homogeneous, clear, viscous elastomer solution with a solid content of 23.4% being formed. Melting point 205 to 210° (Kofler block). The filaments obtained by the conventional wet-spinning process have low tensile strength, low moduli and poor thermal and hydrothermal properties (see Table 2).

(B) Chain lengthening with ethylene-bis-semicarbazide

5.60 g. of ethylene-bis-semicarbazide are dissolved in 300 g. of dimethylformamide at 100°. 200 g. of the NCO preadduct are introduced into the solution when it has cooled to 70°, a stiff, crumbly, pastily swelled elastomer mass being immediately formed, and this, even after heating to 100° and dilution to 18% solid content, cannot be transformed into a spinnable solution. No solution can be obtained even when using dimethylacetamide or N-methyl pyrrolidone instead of dimethylformamide as solvent (see Le A 11 848, Example 1, Comparison Test B).

(C) Chain lengthening with adipic acid hydrazide

If the ethylene-bis-carbazine ester of experiment A is replaced by 5.52 g. of adipic acid dihydrazide, an elastomer solution of 338 poises is obtained, which can be shaped in the usual way into filaments and films.

As will be seen from Table 2, the elastomers obtained with lengthening by adipic acid dihydrazide do in fact show relatively good elastic properties, but the thermal properties (melting point and HDT) are low and the hydrothermal properties (HWTD/HDT) are very unsatisfactory. The reaction according to the invention with the 1,2-ethane carbazine ester semicarbazide (see Example 1) produces from the same NCO preadduct very much better moduli, HDT, melting point and hydrothermal properties than when the lengthening is carried out with the adipic acid dihydrazide of similar structure according to German Pat. 1,123,467.

In the subsequent comparison examples, the usual chain lengtheners which hitherto were normally preferred (ethylene diamine, m-xylene diamine and hydrazine) are reacted with an identical prepolymer to that in Example 1, and it is shown how the properties of the elastomer of which the chains are lengthened therewith differ from the elastomer produced according to the invention and in accordance with Example 1.

(D) Chain lengthening with ethylene diamine

If the ethylene-bis-carbazine ester in experiment A is replaced by 1.88 g. of ethylene diamine and if the procedure in other respects is the same, an elastomer solution having the viscosity of 205 poises/20° C. is obtained and this can be processed in the usual way into films and filaments.

As is shown by Table 2, these elastomers with lengthening by means of ethylene diamine (see for example German Pat. 1,183,196) have substantially lower moduli and only moderate hydrothermal properties. In addition, the elastomer according to the invention and in accordance with Example 1, which was produced from the same NCO preadduct, has a better resistance to ageing in hot air and on exposure to light.

(E) Chain lengthening with m-xylylene diamine

If the procedure of comparison test A is followed and if the ethylene-bis-carbazine ester is replaced by 4.25 g. of m-xylylene diamine, a slightly cloudy elastomer solution is obtained which has a viscosity of 230 poises. Forming of the solution by conventional processes gives films and filaments. As shown by the results in Table 2, the elastomer filaments obtained from the same NCO preadduct as in Example 1 and with m-xylylene diamine (according to Gebrauchmuster 1904/23) have much lower moduli, lower recovery forces, lower melting points, lower HTD values and very moderate hydrothermal properties.

(F) Chain lengthening with hydrazine

If the procedure in comparison test A is followed and if the ethylene-bis-carbazine ester is replaced by 1.60 g. of hydrazine hydrate, an elastomer solution of 342 poises is obtained which quickly becomes discoloured to yellow in air and which is transformed in the normal way into films or filaments. As will be seen from Table 2, the known lengthening (German Pat. 1,161,007) with hydrazine from the same NCO preadduct produces, by comparison with the chain lengthening in accordance with the invention with carbazine ester semicarbazides (see Example 1), filaments with very much lower modulus, lower HDT and less satisfactory hydrothermal behaviour.

As is clearly apparent from the series of the comparison examples, a number of properties have been very clearly improved in a desirable manner by the carbazine ester semicarbazides being employed according to the invention as chain lengtheners, i.e. good tensile strength values, the modulus values are very high (also as recovery moduli in the relaxation curve); the melting point is high, the distortion temperature is very high and the hydrothermal properties are very favourable. In addition, the ageing behaviour is satisfactory.

(G) Chain lengthening with 1,3-propylene-bis-carbazine ester

6.40 g. of 1,3-propylene-bis-carbazine ester are dissolved in 25 g. of water. The aqueous solution is diluted with 300 g. of dimethylformamide. 200 g. of the NCO preadduct solution are allowed to run in at 20° C. while stirring well; a homogeneous, clear, viscous elastomer solution is formed, which has a solid content of 22.7%; melting point 218 to 222° (Kofler block). The filaments obtained by the wet-spinning process show low mechanical strength, low moduli and low hydrothermal properties.

TABLE 2

| Example No. (nature of chain lengthening) | Filament forming method | Elastic properties | | | | | Thermal and hydrothermal properties | | | | | | |
|---|---|---|---|---|---|---|---|---|---|---|---|---|---|
| | | Count, dtex. | Tensile strength, g./dtex. | Elongation at break, percent | Modulus 300%, mg./dtex. | Modulus 150%, 3-return curve, mg./dtex. | Permanent elongation after 3×300% elongation, percent | HWTD HDT, °C | HWTD tension In air at 20°, mg./dtex. | Residual In water at 95°, mg./dtex. | HWS elongation after hydrothermal loading | stretching In air at 20°, percent | In water at 95°, percent | After relaxation in air at 20° percent |
| Comparison Text A | N | 257 | 0.44 | 420 | 40 | 9 | 30 | 75 | 21.5 | 0.7 | 91 | 302 | Breaks off | |
| Ethylene-bis-carbazine ester | F | 465 | 0.20 | 415 | 32 | 9 | 27 | | | | | | | |
| Comparison Example C | N | 326 | 0.60 | 444 | 123 | 18 | 14 | 128 | 29.0 | 8.5 | 54 | 102 | 572 | 302 |
| Adipic acid dihydrazide | F | 311 | 0.79 | 445 | 71 | 16 | 12 | | | | | | | |
| Comparison Example D | N | 330 | 0.42 | 452 | 78 | 15 | 23 | 156 | 20.5 | 11.8 | 44 | 102 | 388 | 162 |
| Ethylenediamine | F | 581 | 0.57 | 563 | 66 | 18 | 20 | | | | | | | |
| Comparison Example E | N | 310 | 0.53 | 452 | 62 | 15 | 15 | 143 | 23.4 | 7.5 | 57 | 166 | Breaks off in hot water | |
| m-Xylylene diamine | F | 549 | 0.61 | 527 | 52 | 15 | 19 | | | | | | | |
| Comparison Example F | N | 322 | 0.42 | 407 | 92 | 15 | 13 | 128 | 24.1 | 9.9 | 48 | 138 | Breaks off in hot water | |
| Hydrazine hydrate | F | 511 | 0.60 | 522 | 63 | 17 | 12 | | | | | | | |
| Comparison Example G | N | 282 | 0.65 | 490 | 106 | 16 | 17 | 132 | 28.0 | 9.5 | 62 | 94 | Breaks off | |
| 1,3-propylene-bis-carbazine ester | F | 404 | 0.70 | 505 | 62 | 15 | 17 | | | | | | | |

What we claim is:
1. A linear segmented polyurethane elastomer consisitng of the reaction product of an isocyanate preadduct containing 1.0 to 6.0% by weight of free NCO groups with chain lengtheners, said polyurethane elastomer containing at least 55 mol percent, based on the total amount of chain lengthening segments, of a chain lengthening segment of the structure

—NH—CO—NH—NH—CO—NH—R
                 —O—CO—NH—NH—CO—NH— wherein R is a divalent alkylene radical with 1 to 4 carbon atoms, an aromatic or an araliphatic radical.

2. The linear segmented polyurethane elastomer according to claim 1, said chain lengthening segment havnig the formula

—NH—CO—NH—NH—CO—NH—$(CH_2)_2$
                 —O—CO—NH—NH—CO—NH—

3. The linear segmented polyurethane elastomer according to claim 1, said chain lengthening segment having the formula

—NH—CO—NH—NH—CO—NH—$(CH_2)_3$
                   —O—CO—NH—NH—CO—NH—

4. The linear segmented polyurethane elastomers according to claim 1, said chain lengthening segment having the formula

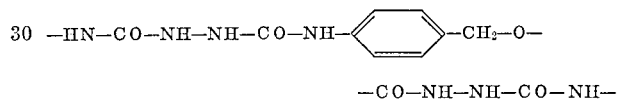

5. The linear segmented polyurethane elastomer according to claim 1, wherein said preadduct is a reaction product of higher molecular weight dihydroxy compounds with excess molar quantities of diisocyanates.

6. The linear segmented polyurethane elastomer according to claim 1, wherein said preadduct is a reaction product of higher molecular weight dihydroxy compounds and low molecular weight diols of molecular weights of from 62 to about 300, wherein said low molecular weight diols are present in quantities of about 0.05 to 1.0 mol per mol of the higher molecular weight dihydroxy compound, with excess molar quantities of diisocyanates.

7. The linear segmented polyurethane elastomer according to claim 6, wherein said low molecular weight diols contain 1 to 2 tertiary amino groups in the molecule.

8. A linear segmented polyurethane elastomer with an elongation at break greater than 300° and an inherent viscosity of at least 0.5 (determined in a 1% solution in hexamethylphosphoramide at 25° C.), consisting of at least 55 mol percent based on the total intralinear segments which are present, of intralinear segments of the structure

[—(O—D—O—CO—NH—Y—NH—CO)$_r$—(O
—G—O—CO—NH—Y—NH—CO)$_s$]—$_m$—[NH
—NH—CO—NH—R—O—CO—NH—NH—CO
                             —NH—Y—NH—CO—]$_n$ wherein D represents a long-chain, divalent, aliphatic polymer residue of a relatively high molecular weight polyhydroxyl compound with a molecular weight of from 600 to 5000 and a melting point below 60° C., Y represents a divalent organic radical of an aromatic, aliphatic, cycloaliphatic or araliphatic diisocyanate, G represents a divalent aliphatic, cycloaliphatic or araliphatic radical of a dialcohol optionally containing one or more tertiary aliphatic amino groups and with molecular weight between 62 and 300, R represents a divalent organic radical selected from the group consisting of an alkylene radical with 2 to 4 carbon atoms, an aromatic radical and an araliphatic radical, r is an integer of from 1 to 5 as
s is 0 or an integer of from 1 to 5
m is 1 or an integer of from 1 to 5, and
n is an integer of from 1 to 5.

9. The linear segmented polyurethane elastomer according to claim 8, said divalent organic radical R having the formula $$-(CH_2)_2-$$

10. The linear segmented polyurethane elastomer according to claim 8, said divalent organic radical R having the formula $$-(CH_2)_3-$$

11. The linear segmented polyurethane elastomer according to claim 8, said divalent organic radical R having the formula

12. The linear segmented polyurethane elastomer according to claim 6, consisting of 100 mol percent of said intralinear segments.

13. The linear segmented polyurethane elastomer according to claim 8, consisting of at least 55 mol percent based on the total intralinear segments which are present, of said intralinear segments and of up to 45 mol percent of conventional intralinear segments, said conventional chain lengthening segments being reaction products of water, hydrazine, aminoalcohols, diamines and dihydrazides with an isocyanate preadduct containing 1 to 6% by weight of free NCO groups.

14. Highly elastic polyurethane elastomer filaments with an elongation at break greater than 300% and an inherent viscosity of at least 0.5 (determined in a 1% solution in hexamethyl phosphoramide at 25° C.), consisting of at least 55 mol percent based on the total intralinear segments which are present of intralinear segments of the structure

[—(O—D—O—CO—NH—Y—NH—CO)$_r$—(O—G—O—CO—NH—Y—NH—CO)$_s$]$_m$—[NH NH—CO—NH—R—O—CO—NH—NH —CO—NH—Y—NH—CO—]$_n$ wherein D represents a long-chain, divalent, aliphatic polymer residue of a relatively high molecular weight polyhydroxyl compound with a molecular weight of from 600 to 5000 and a melting point below 60° C.,
Y represents a divalent organic radical of an aromatic, aliphatic, cycloaliphatic or araliphatic diisocyanate,
G represent a divalent aliphatic, cycloaliphatic or araliphatic radical of a dialcohol optionally containing one or more tertiary aliphatic amino groups and with molecular weight between 62 and 300,
R represents a divalent organic radical selected from the group consisting of an alkylene radical with 2 to 4 carbon atoms, an aromatic radical and an araliphatic radical, r is an integer of from 1 to 5 as
s is 0 or an integer of from 1 to 5,
m is 1 or an integer of from 1 to 5, and
n is an integer of from 1 to 5.

15. Solutions of polyurethane elastomers containing in highly polar, aliphatic solvents with amide, urea or sulphoxide groups and boiling points up to 225° C., 10 to 33% by weight of substantially linear segmented polyurethanes according to claim 8.

16. A process for the production of substantially linear, segmented polyurethane elastomers which comprises reacting an isocyanate preadduct of a higher molecular weight dihydroxy compound and an excess molar quantity of diisocyanate, said preadduct containing 1.0 to 6.0% by weight of free NCO groups, with substantially equivalent quantities of bifunctional low molecular weight chain lengtheners containing two active hydrogen atoms, said chain lengtheners being at least 55 mol percent of carbazine ester semicarbazides of the formula $$H_2N-NH-CO-NH-R-O-CO-NH-NH_2$$

wherein

R represents an alkylene radical with 2 to 4 alkylene groups or an aromatic or araliphatic radical, said reaction being carried out in the presence of highly polar organic solvents and with subsequent removal of the solvents.

17. The process according to claim 16, wherein an addition to at least 55 mol percent of the carbazine ester semicarbazides up to 45 mol percent of conventional, bifunctional compounds comprising two active hydrogen atoms and with molecular weights from 18 to 300 are concurrently used as chain lengtheners.

References Cited

UNITED STATES PATENTS 3,475,377  10/1969  Rosendahl ____ 260—77.5 AM
3,148,173  9/1964   Axelrood _____ 260—77.5 AM MORRIS LIEBMAN, Primary Examiner
P. R. MICHL, Assistant Examiner U.S. Cl. X.R.

260—30.4, 30.6, 31.2, 32.4, 32.6, 32.8, 33.2, 33.8, 75, 77.5, 479, 482